United States Patent
Xu et al.

(10) Patent No.: US 12,536,418 B2
(45) Date of Patent: Jan. 27, 2026

(54) PERTURBATIVE NEURAL NETWORK

(71) Applicant: CARNEGIE MELLON UNIVERSITY, Pittsburgh, PA (US)

(72) Inventors: Felix Juefei Xu, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 514 days.

(21) Appl. No.: 16/976,398

(22) PCT Filed: Apr. 29, 2019

(86) PCT No.: PCT/US2019/029603
§ 371 (c)(1),
(2) Date: Aug. 27, 2020

(87) PCT Pub. No.: WO2019/210294
PCT Pub. Date: Oct. 13, 2019

(65) Prior Publication Data
US 2021/0034952 A1 Feb. 4, 2021

Related U.S. Application Data

(60) Provisional application No. 62/762,298, filed on Apr. 27, 2018.

(51) Int. Cl.
*G06N 3/04* (2023.01)
*G06N 3/048* (2023.01)
*G06N 3/08* (2023.01)

(52) U.S. Cl.
CPC ............. *G06N 3/048* (2023.01); *G06N 3/08* (2013.01)

(58) Field of Classification Search
CPC ................................ G06N 3/048; G06N 3/08
USPC .......................................................... 706/25
See application file for complete search history.

(56) References Cited

U.S. PATENT DOCUMENTS

| | | | | |
|---|---|---|---|---|
| 10,140,544 | B1* | 11/2018 | Zhao | G06N 20/00 |
| 10,223,610 | B1* | 3/2019 | Akselrod-Ballin | G06T 7/174 |
| 10,419,762 | B2* | 9/2019 | Froehlich | H04N 19/156 |
| 10,521,718 | B1* | 12/2019 | Szegedy | G06N 3/084 |
| 10,701,359 | B2* | 6/2020 | Su | H04N 19/186 |
| 2002/0071140 | A1* | 6/2002 | Suzuki | H04N 1/4051 |
| | | | | 358/3.01 |
| 2009/0092258 | A1* | 4/2009 | Merimaa | H04S 7/30 |
| | | | | 381/1 |

(Continued)

FOREIGN PATENT DOCUMENTS

EP 0786106 B1 1/2002

OTHER PUBLICATIONS

Audhkhasi et al., "Noise-enhanced convolutional neural networks", Neural Networks 78 (2016) 15-23 (Year: 2016).*

(Continued)

*Primary Examiner* — Omar F Fernandez Rivas
*Assistant Examiner* — Tri T Nguyen
(74) *Attorney, Agent, or Firm* — KDW FIRM PLLC

(57) ABSTRACT

Perturbative neural networks are comprised of one or more modules, called perturbation layers which can be used as an alternative to a convolutional layer. The perturbation layer does away with convolution in the traditional sense and instead computes its response as a weighted linear combination of non-linearly activated additive noise perturbed inputs.

16 Claims, 2 Drawing Sheets

(56) References Cited

U.S. PATENT DOCUMENTS

| | | | | |
|---|---|---|---|---|
| 2009/0147020 | A1* | 6/2009 | Sellers | H04N 9/642 345/603 |
| 2016/0019459 | A1* | 1/2016 | Audhkhasi | G06V 30/194 706/22 |
| 2016/0162781 | A1 | 6/2016 | Lillicrap et al. | |
| 2016/0259980 | A1* | 9/2016 | Mlybari | G06T 7/277 |
| 2017/0061246 | A1* | 3/2017 | Chen | G06F 18/28 |
| 2017/0091951 | A1* | 3/2017 | Yoo | G06T 7/11 |
| 2017/0132496 | A1* | 5/2017 | Shoaib | G06N 3/0464 |
| 2017/0372201 | A1* | 12/2017 | Gupta | G06N 3/084 |
| 2018/0033024 | A1* | 2/2018 | Latapie | G06V 20/53 |
| 2019/0122116 | A1* | 4/2019 | Choi | G06N 3/048 |
| 2019/0220691 | A1* | 7/2019 | Valpola | G06F 18/214 |
| 2019/0251396 | A1* | 8/2019 | Geraci | G06N 3/063 |
| 2019/0272870 | A1* | 9/2019 | Choi | G11C 11/54 |
| 2019/0287283 | A1* | 9/2019 | Lin | G06T 5/60 |
| 2019/0294413 | A1* | 9/2019 | Vantrease | G06F 7/5095 |
| 2019/0303715 | A1* | 10/2019 | Jiang | G06N 3/084 |
| 2019/0362522 | A1* | 11/2019 | Han | A61B 5/055 |
| 2020/0394520 | A1* | 12/2020 | Kruglov | G06N 3/045 |

OTHER PUBLICATIONS

Xu et al., Local Binary Convolutional Neural Networks, Aug. 22, 2016, 10 pages (Year: 2016).*

International Search Report and Written Opinion of International Patent Application No. PCT/US2019/029603, mailed on Jul. 18, 2019, 6 pages.

Song et al., "Robust Neural Network Tracking Controller Using Simultaneous Perturbation Stochastic Approximation", IEEE Transactions on Neural Networks, 19(5), May 2008. Retrieved from <URL: https://www.jhuapl.edu/spsa/pdf-spsa/song_etal_ieee_tnn08.pdf>. Retrieved on Jun. 20, 2019, 19 pages.

Juefei-Xu et al., "Perturbative Neural Networks", arXiv:1806.01817v1 [cs.CV], Jun. 5, 2018. Retrieved from <URL: https://arxiv.org/pdf/1806.01817.pdf> Retrieved on Jun. 19, 2019, 14 pages.

Zurada et al., "Perturbation Method for Deleting Redundant Inputs of Perceptron Networks", Neurocomputing, 14(2), Feb. 5, 1997, pp. 177-193. Retrieved from <URL: http://ci.louisville.edu/zurada/publications/zurada.nc.1997.pdf>. Retrieved on Jun. 20, 2019.

* cited by examiner

PERTURBATIVE NEURAL NETWORK

RELATED APPLICATIONS

This application is a national phase filing under 35 U.S.C. § 371 claiming the benefit of and priority to International Patent Application No. PCT/US2019/029603, filed on Apr. 29, 2019, which claims the benefit of U.S. provisional patent application No. 62/762,298, filed Apr. 27, 2018. The entire contents of these applications are incorporated herein by reference.

GOVERNMENT RIGHTS

This invention was made with government support under contract 20131JCXK005 awarded by the Department of Justice and contract N6833516C0177 awarded by NavAir. The government has certain rights in the invention.

BACKGROUND OF THE INVENTION

Convolutional neural networks (CNNs) have achieved wide adoption in computer vision systems with numerous applications across a range of visual recognition tasks. Much of this success is fueled through advances in convolutional neural network architectures and learning algorithms, even as the basic premise of a convolutional layer has remained unchanged.

Deep convolutional neural networks (CNNs) have been overwhelmingly successful across a variety of visual perception tasks, as many different architectures have evolved. Much of the effort in this area has been focused on the topology and connectivity between convolutional and other modules while the convolutional layer itself has continued to remain the backbone of these networks.

Convolutional layers are characterized by two main properties, namely, local connectivity and weight sharing, both of which afford these layers significant computational and statistical efficiency over densely connected layers. The architectures of these convolutional layers have evolved. For example, the use of convolutional weights with very small receptive fields (3×3) that are both statistically and computationally efficient for learning deep convolutional neural networks. As convolutional layers are often the main computational bottleneck of CNNs, there have been steady developments directed to improving the computational efficiency of convolutional layers. As an example, consider the efficient reparameterization of standard 3×3 convolutional weights, in terms of depth-wise convolutions and 1×1 convolutions. Convolutional networks with binary weights (local binary CNNs, or LBCNNs) have been proposed to significantly improve the computational efficiency of CNNs. Recent work has also demonstrated that sparse convolutional weights perform comparably to dense convolutional weights while also being more computationally efficient. Across this entire body of work the basic premise of a convolutional layer itself has largely remained unchanged. However, the convolutional layer remains computationally intensive, and, as such, it would be desirable to replace the convolutional layer with a less computationally intensive device.

SUMMARY OF THE INVENTION

This invention seeks to remedy the recognized difficulty of using computationally intensive convolutional layers, particularly for the task of image recognition. The success of a wide range of approaches that utilize convolutional layers that have very small receptive fields (3×3), sparse convolutional weights, and convolutional weights with binary weights, demonstrates the viability of doing away with convolutional layers for leaning high performance image classification models and replacing the convolutional layer with a more efficient device.

In the present invention, the convolutional layer is replaced by a new module, referred to herein as a perturbation layer, that is devoid of standard convolutional operations. Given an input, the perturbation layer first perturbs the input additively through random, but fixed, noise followed by a weighted combination of non-linear activations of the input perturbations. The weighted linear combinations of activated perturbations are conceptually similar to 1×1 convolutions but are not strictly convolutional since their receptive field is just one pixel, as opposed to the receptive fields of standard convolutional weights.

The perturbation layer is thus an extreme version of sparse convolutional weights with sparsity of one non-zero element and fixed non-zero support at the center of the filter. Avoiding convolutions with receptive fields larger than one pixel offers immediate statistical advantage in the form of fewer learnable network parameters, computational savings from more efficient operations (weighted sum vs. convolution) and, more importantly, challenges the utility of convolutional layers in the context of image classification models.

Theoretical analyses show that the perturbation layer can approximate the response of a standard convolutional layer. In addition, deep neural networks with the perturbation layers as replacements for standard convolutional layers perform as well as an equivalent network with convolutional layers across a variety of standard datasets of varying difficulty and scale.

DETAILED DESCRIPTION OF THE INVENTION

Figure 1:
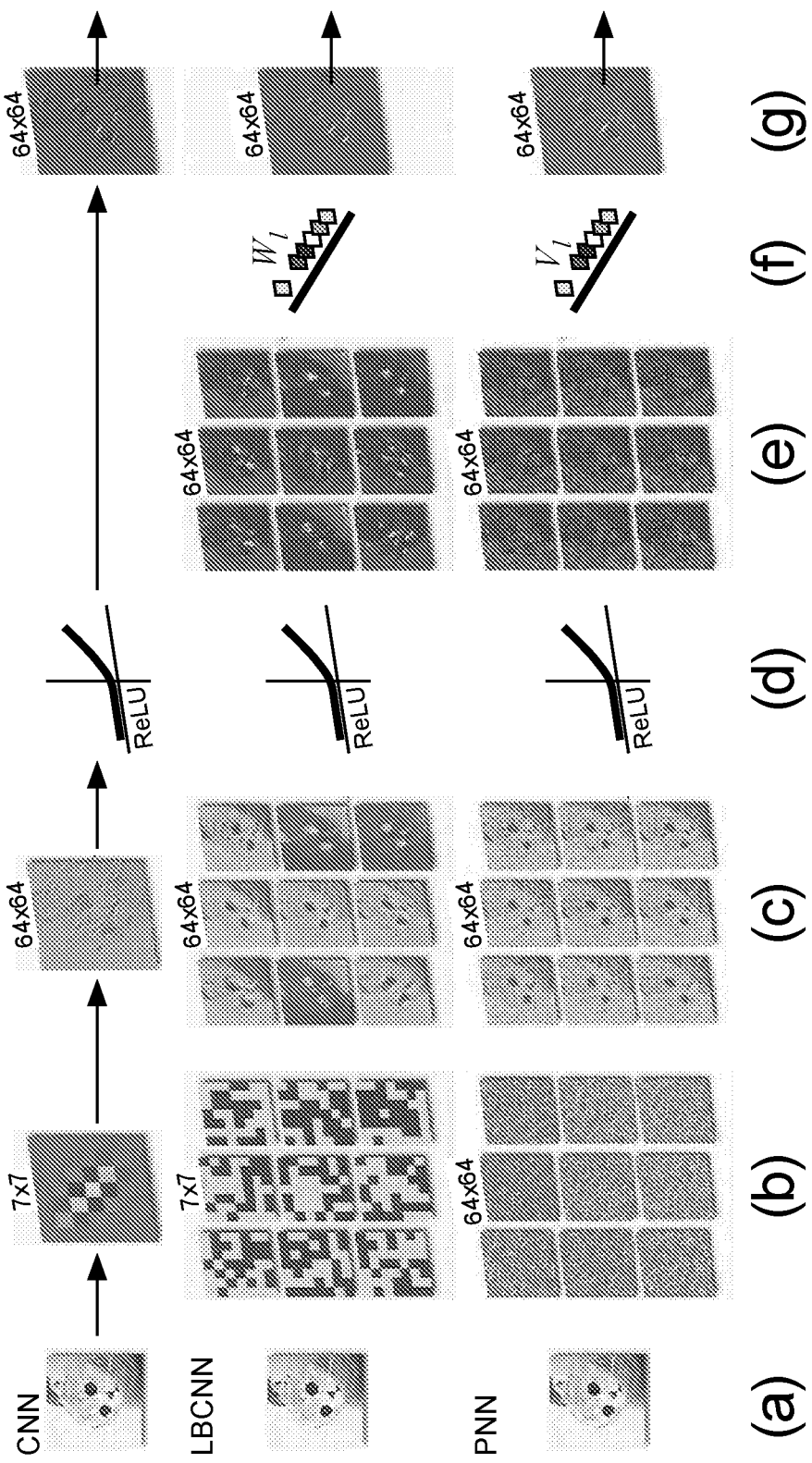
FIG. 1 is a schematic comparison of a single layer of a CNN, a single layer of an LBCNN and a single layer of a perturbative neural network (PNN) in accordance with this invention.

FIG. 1 is a schematic representation of a perturbative layer (PNN). The input image (a) will be perturbed with a set of pre-defined random additive noise masks (b), each with the same size as the input image, resulting in a set of noise-perturbed response maps (c). Response maps will go through a non-linearity (d), for example a rectified linear unit (ReLU) function, resulting in activated response maps (e), which are then linearly combined to form one final feature map (g). The random additive noise masks are pre-defined and non-learnable. The only learnable parameters are the linear combination weights (f) used to combine the activated response maps (e) into the final feature map (g).

In comparison with a convolutional layer (CNN), which has a learnable convolutional filter, the PNN is more like a LBCNN, which uses a non-learnable binary mask, whereas the PNN uses a non-learnable ransom noise mask. Both the LBCNN and the PNN use learnable linear weights (f) to transform activated maps into feature maps.

Mathematically, a perturbative neural network (PNN) transforms the input and output of layer l in the following way:

$$x_{l+1}{}^t = \Sigma_{i=1}{}^m \sigma_{relu}(\mathcal{N}^i + x_l^i) \cdot V_{l,i}{}^t \quad (1)$$

where:

t is the output channel index;

i is the input channel index; and $\mathcal{N}^i$ is the i-th random additive perturbation mask in layer l; and $V_{l,i}{}^t$ is the vector of learnable linear coefficients.

The linear coefficients $V_{l,i}{}^t$ are the only learnable parameters of the perturbation layer. Not surprisingly, the PNN is able to save learnable parameters. From Eq. (1), it can be observed that the computationally expensive convolution operation is replaced by an element-wise noise addition, which is significantly more efficient. In contrast with, for example, an LBCNN, in which the center of each receptive field is reduced to a single point on the feature map, PNN provides a simpler mapping, in which $y=f(x_c)=x_c+n_c$, where $n_c$ is the added noise corresponding to the $x_c$ location. An attractive attribute of the PNN formulation is that repetitive operation, such as the convolution (moving from one patch to the other) is no longer needed. A single pass for adding the noise perturbation mask to the entire input channel completes the task.

Convolution leverages two important properties that can help improve a machine learning system: sparse interactions and parameter sharing. The proposed PNN also shares these properties.

Regarding sparse interactions, PNN adds perturbation to the input with a perturbation mask of the same size as the input. Therefore, one can see that only a single element in the input is needed to generate one element in the output perturbation map.

Figure 2:
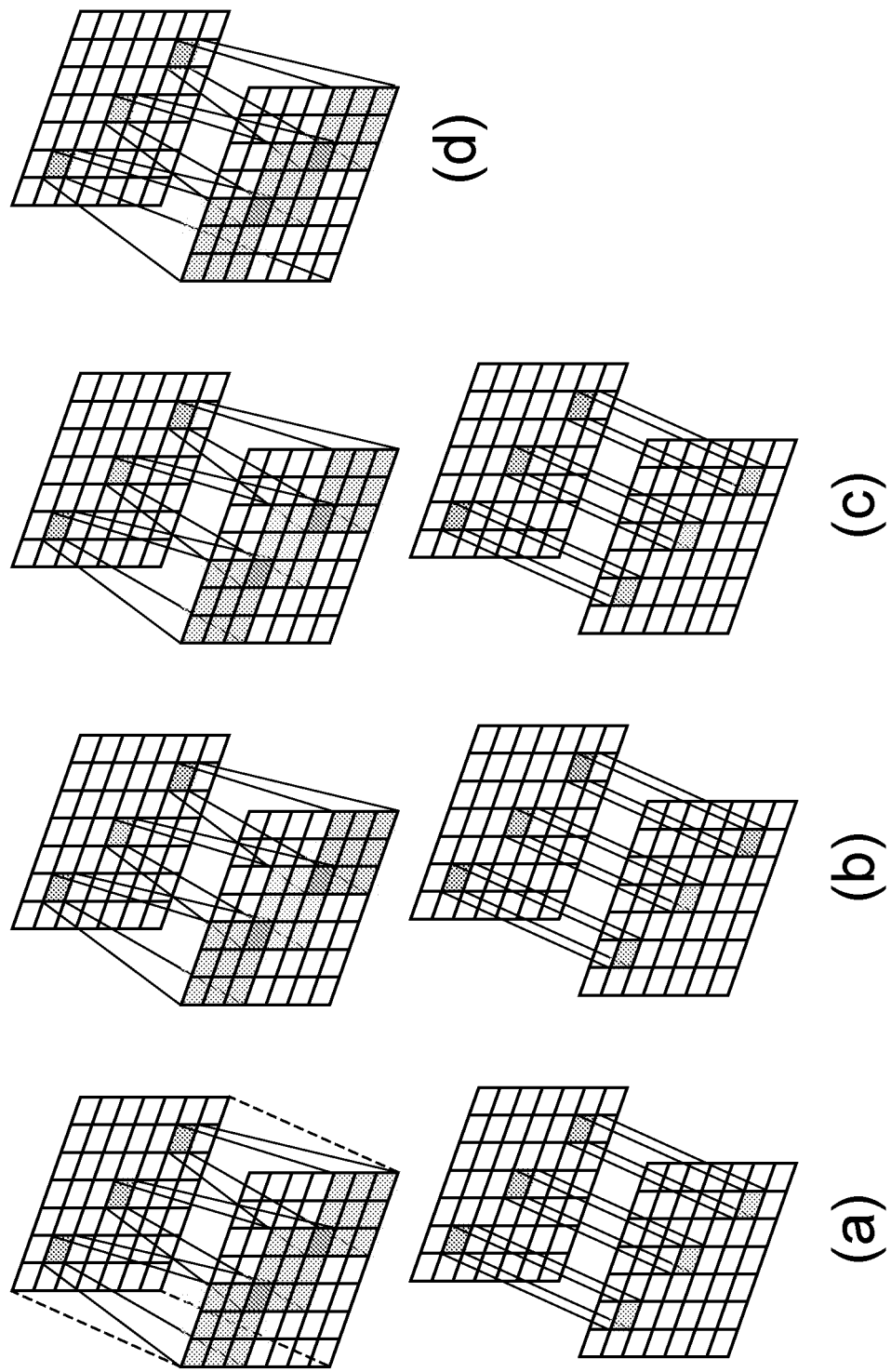
FIG. 2 shows the variations in connectivity among commonly-practiced types of convolutions.

Additionally, PNN utilizes a set of learnable linear weights, or equivalently, a 1×1 convolution, to combine various perturbation maps to create one feature map. When a 1×1 convolution is applied on the input map, only one element of the input contributes to each output element, as opposed to a higher order convolution, which involves multiple elements of the input. For example, as depicted in FIG. 2, a 3×3 convolution will involve 9 elements from the input for each element of the output. Therefore, 1×1 convolution provides the sparsest interactions possible. FIG. 2 shows various commonly practiced convolutions. View (a) shows a regular convolution, view (b) shows a locally connected convolution; view (c) shows a tiled convolution, and view (d) shows a fully connected layer. It is important to note that while a perturbation layer by itself has a receptive field of one pixel, the receptive field of a PNN would typically cover the entire image with an appropriate size and number of pooling layers.

Although the fixed perturbation masks are shared among different inputs, they are not learnable, and therefore not considered as the parameters in this context. Here, the parameter sharing is carried out again by the 1×1 convolution that linearly combines the various non-linearly activated perturbation masks. In addition, PNN has other desirable properties such as multi-scale equivalent convolutions (i.e., adding different amounts of perturbation noise is equivalent to applying convolutions at different scales). More specifically, adding small noise corresponds to applying a small-sized convolutional filter, and adding larger noise corresponds to convolving with a larger filter. Without explicitly setting the filter sizes throughout the network layers, PNN allows the network to adapt to different filter sizes automatically and optimally. Finally, PNN also has a distance preserving property.

Implementation Details.

In various embodiments, a neural network can be constructed composed entirely of perturbative layers. In alternate embodiments, the neural network can be constructed of a mixture of perturbative layers and standard convolutional and/or local binary convolutional layers. In practice, any number of perturbation masks may be used to mask the input to produce an equal number of response maps. The number of dimensions of the perturbation mask, for the first layer of the PNN, should match the number of dimensions of the input image. For example, if the input image is 3-channel, the perturbative masks (also referred to as noise masks) must also be 3-channel, such that a pixel at location (x, y, c) will be added with noise at location (x, y, c), where c is a channel index. After the first layer, the number of channels can increase, in which case the number of noise mask channels increases to match the input channels.

As an example, to produce 64 noise perturbed response maps from 64 input channels, several approaches can be used. First, 64 noise masks could be used, one for each of the 64 input channels, to produce the final 64 noise perturbed response maps. Alternatively, only 32 noise masks could be used, where each noise mask is re-used for 2 input channels (or, in fact, any number of noise masks may be reused any number of times). Lastly, only 1 noise mask could be used, which is re-used for all 64 input channels. Depending on various applications and the computation resource budget, the aforementioned trade-offs can all be beneficial for certain cases.

Parameter Savings—The number of learnable parameters in the perturbation layer is significantly lower than those of a standard convolutional layer for the same number of input and output channels. Let the number of input and output channels be p and q respectively. With a convolutional kernel of size of h×w, a standard convolutional layer consists of p·h·w·q learnable parameters. The corresponding perturbation layer consists of p·m fixed perturbation masks and m·q learnable parameters (corresponding to the 1×1 convolution), where m is the number of fan-out channels of the perturbation layer, and the fan-out ratio (m/p) is essentially the number of perturbation masks applied on each input channel. The 1×1 convolutions act on the m perturbed maps of the fixed filters to generate the q-channel output. The ratio of the number of parameters in CNN and PNN is:

$$\frac{\text{\# of parameters in } CNN}{\text{\# of parameters in } PNN} = \frac{p \cdot h \cdot w \cdot q}{m \cdot q} = \frac{p \cdot h \cdot w}{m} \quad (2)$$

Learning with Perturbation Layers

Training a network end-to-end with perturbation layers instead of standard convolutional layers is straightforward. The gradients can be back propagated through the 1×1 convolutional layer and the additive perturbation masks in much the same way as they can be back propagated through standard convolutional layers. Backpropagation through the noise perturbation layer is similar to propagating gradients through layers without learnable parameters (e.g., ReLU, max pooling, etc.). However, during learning, only the learnable 1×1 filters are updated while the additive perturbation masks remain unaffected. For the forward propagation defined in Eq. (1), backpropagation can be computed as.

$$\frac{\partial \hat{y}}{\partial x} = \sum_{i=1}^{N} v_i \text{ and} \quad (3)$$

$$\frac{\partial \hat{y}}{\partial v_i} = x + n_i \quad (4)$$

The perturbation masks are of the same spatial size as the input tensor, and for each input channel, we can generate m/p masks separately (m/p is the far-out ratio). Specifically, the additive noise in the perturbation masks are independently uniformly distributed. The formulation of PNN does not require the perturbation noise to be a specific type, as long as it is zero-mean and has finite variance. Adding zero-mean Gaussian noise with different variances performs comparably to adding zero-mean uniform noise with different range levels, however, uniform distribution provides better control over the energy level of the noise.

The difference ($\epsilon_i$) between neighboring pixels can be treated as a random variable with $E(\epsilon_i)=0$, $E(\epsilon_i^2)=2\sigma^2(1-\rho)=2\sigma^2\delta$, and $E(\epsilon_i, \epsilon_j)=\sigma^2(1-\rho)=\sigma^2\delta$. The correlation coefficient $\rho_\epsilon$ between $\epsilon_i$ and $\epsilon_j$ can be derived as follows.

$$\rho_\epsilon = \frac{E(\epsilon_i \epsilon_j)}{\sqrt{E(\epsilon_i^2)}\sqrt{E(\epsilon_j^2)}} = \frac{\sigma^2 \delta}{\sqrt{2\sigma^2\delta}\sqrt{2\sigma^2\delta}} = \frac{\sigma^2\delta}{2\sigma^2\delta} = \frac{1}{2} \quad (5)$$

This suggests that the choice of distribution of the noise $\epsilon_i$ in the PNN formulation can potentially be flexible.

Additionally, the additive perturbation noise level (variance of the noise) in PNN can be related to the size of the convolutional filter in traditional CNN. More specifically, adding noise with low variance is equivalent to using a small-sized convolutional filter, while adding noise with larger variance is equivalent to convolving with a larger filter. Therefore, by adjusting the noise distribution (variance) PNN can potentially mimic a CNN with different filter sizes using different noise variance in each channel of the perturbation noise layer without having to explicitly decide on the filter sizes throughout the network layers. Adding up more terms as the convolutional filter size becomes larger would result in a Gaussian distributed perturbation noise with larger variance.

Convolutional layers have become the mainstay of state-of-the-art image classification tasks. Many different deep neural network architectures have been proposed building on convolutional layers, including convolutional layers with small receptive fields, sparse convolutional weights, binary convolutional weights, factorizations of convolutional weights, etc. However, the basic premise of a convolutional layer has remained the same through these developments. In this paper, we sought to validate the utility of convolutional layers through a module that is devoid of convolutional weights and only computes weighted linear combinations of non-linear activations of additive noise perturbations of the input.

Deep neural networks with the perturbation layers perform as well as networks with standard convolutional layers across different scales and difficulty of image classification and detection datasets. Our findings suggest that perhaps high performance deep neural networks for image classification and detection can be designed without convolutional layers.

We claim:

1. A method performed by a perturbative layer in a neural network comprising:
   receiving an input;
   applying a plurality of perturbative masks to each channel of the input, each perturbative mask comprising random noise, resulting in a plurality of noise-perturbed response maps;
   applying a non-linear function to the plurality of response maps to produce a plurality of activated response maps;
   applying a vector of learnable coefficients to the plurality of activated response maps to produce a single feature map; and
   using the single feature map as an input to a next layer in the neural network;
   wherein each of the perturbative masks is identical; and
   wherein the neural network comprises one or more of the perturbative layers; and
   wherein the feature map is related to the input in each perturbative layer by the equation:

$$x_{l+1}^t = \sum_{i=1}^{m} \sigma(N_l^i + x_l^i) \cdot v_{l,i}^t$$

wherein:
t is an index to the output channel;
i is an index to the input channel;
σ is a non-linear function;
$N_l^i$ is an i-th random additive perturbation mask in layer l; and
$V_{l,i}^t$ is the vector of scalar learnable coefficients.

2. The method of claim 1 wherein each perturbative mask is of the same size and of the same number of channels as the input.

3. The method of claim 1 wherein each pixel in a particular response map is related to a corresponding pixel in the input by the equation:

$y=f(x_c)=x_c+n_c;$ wherein $n_c$ is the additive noise corresponding to the $x_c$ location in the input.

4. The method of claim 1 wherein each response map is of the same size and same number of channels as the input.

5. The method of claim 1 wherein the non-linear function is a rectified linear unit (ReLU) function.

6. The method of claim 1 wherein the random noise in each perturbative mask is zero-mean Gaussian noise with a finite variance.

7. The method of claim 1 wherein the random noise in each perturbative mask is zero-mean Gaussian noise, with a variance that varies from layer to layer in the neural network.

8. The method of claim 1 wherein the random noise in each perturbative mask is zero-mean uniform noise.

9. The method of claim 8 wherein the random noise in each perturbative mask has a range that can be varied from layer to layer in the neural network.

10. The method of claim 1 wherein each learnable coefficient in the vector of learnable coefficients corresponds to one of the plurality of activated response maps.

11. The method of claim 1 wherein the neural network comprises a combination of perturbative layers and standard convolutional layers.

12. The method of claim 1 wherein the neural network comprises a combination of perturbative layers and local binary convolutional layers.

13. The method of claim 1 wherein the neural network comprises a combination of perturbative layers, standard convolutional layers and local binary convolutional layers.

14. The method of claim 1 wherein the perturbative mask is identical for each channel of the input.

15. The method of claim 1 wherein the perturbative mask is different for each channel of the input.

16. The method of claim 1 wherein a number of unique perturbative masks is less than the number of channels of the input.

\* \* \* \* \*